United States Patent
Yoshikawa

(10) Patent No.: US 8,515,665 B2
(45) Date of Patent: Aug. 20, 2013

(54) ON-BOARD VEHICLE NAVIGATION DEVICE AND PROGRAM

(75) Inventor: Kazutaka Yoshikawa, Okazaki (JP)

(73) Assignee: Aisin AW Co., Ltd., Anjo-shi (JP)

( * ) Notice: Subject to any disclaimer, the term of this patent is extended or adjusted under 35 U.S.C. 154(b) by 894 days.

(21) Appl. No.: 12/550,572

(22) Filed: Aug. 31, 2009

(65) Prior Publication Data

US 2010/0063722 A1  Mar. 11, 2010

(30) Foreign Application Priority Data

Sep. 9, 2008  (JP) ................... 2008-230938

(51) Int. Cl.
*G01C 21/34* (2006.01)
*G08G 1/123* (2006.01)
*H04B 1/06* (2006.01)

(52) U.S. Cl.
USPC .................... 701/411; 701/414; 455/344

(58) Field of Classification Search
None
See application file for complete search history.

(56) References Cited

U.S. PATENT DOCUMENTS 6,807,483 B1 * 10/2004 Chao et al. .................... 701/411
2006/0009188 A1 * 1/2006 Kubota et al. ................. 455/344

FOREIGN PATENT DOCUMENTS

| JP | 08106596 A | 4/1996 |
|---|---|---|
| JP | 2007170864 A | 5/2007 |
| JP | 2007256196 A | 10/2007 |
| JP | 2008-033774 | 2/2008 |
| JP | 2008191909 A | 8/2008 |

* cited by examiner

*Primary Examiner* — Thomas Black
*Assistant Examiner* — Tyler Paige
(74) *Attorney, Agent, or Firm* — Bacon & Thomas, PLLC

(57) ABSTRACT

Signal data stored in an information storage unit of an on-board vehicle navigation device includes signal numbers, position information for each signal, signal indication information for determining the indication, and information for a relationship between the indications and times for each signal. Based on a determination that the target signal has been set by selecting a signal intersection on a map screen (S10), a route from a current position to the target signal is searched (S31). Signals on the set route are read from map data (S60). Travel time between the current position and the closest signal on the route and the travel times required between adjacent signals on the route are calculated (S70). The indication information for each signal is predicted from the travel times required and the signal indication information in the signal data (S80). And then, the indication of the target signal at the time of arrival is determined and announced (S90).

10 Claims, 11 Drawing Sheets

ON-BOARD VEHICLE NAVIGATION DEVICE

FIG. 7

(NUMBERS IN PARENTHESES ARE TRAVEL TIMES REQUIRED[UNIT:SEC.])

| PASSED SIGNAL | ENTRY DIRECTION | SECOND SIGNAL | THIRD SIGNAL | FOURTH SIGNAL | FIFTH SIGNAL | SIXTH SIGNAL | --- |
|---|---|---|---|---|---|---|---|
| T1 | (FROM SOUTH) | T2:BLUE (50) | T3:BLUE (40) | T4:RED (50) | --- | | |
| | | | | T7:RED (40) | --- | | |
| | | | | T11:BLUE (30) | T12:RED (40) | --- | |
| | | | | | T10:BLUE (40) | T9:BLUE (60) | --- |
| | | | | | | T2:RED (40) | --- |
| | | | T6:RED (30) | --- | --- | | |
| | | | T10:BLUE (40) | T11:BLUE (40) | --- | | |
| | | | | T9:RED (60) | --- | | |
| | | T5:BLUE (40) | --- | | | | |
| | | T0:RED (50) | --- | | | | |
| | (FROM NORTH) | T2:BLUE (50) | --- | | | | |
| | | T9:RED (60) | --- | | | | |
| | | T0:RED (50) | --- | | | | |
| | (FROM WEST) | --- | | | | | |
| | (FROM EAST) | --- | | | | | |
| T2 | (FROM SOUTH) | T3:BLUE (40) | --- | | | | |
| | | T6:BLUE (40) | --- | | | | |
| | | T1:RED (50) | --- | | | | |
| | (FROM WEST) | --- | --- | | | | |
| | (FROM EAST) | --- | | | | | |
| --- | --- | --- | | | | | |

FIG. 9

(NUMBERS ON THE LEFT SIDE OF SIGNAL COLORS ARE TRAVEL TIMES [UNIT:SEC.])

| PASSED SIGNAL | ENTRY DIRECTION | SECOND SIGNAL | THIRD SIGNAL | FOURTH SIGNAL | FIFTH SIGNAL |
|---|---|---|---|---|---|
| T1 | (FROM SOUTH) | T2 | 30:BLUE | T4 | 30:BLUE |
| | | | | | 40:BLUE |
| | | | | | 50:RED |
| | | | | | --- |
| | | | | T11 | --- |
| | | | | T7 | --- |
| | | | T3 | T4 | 30:BLUE |
| | | | 40:BLUE | | 40:RED |
| | | | | | 50:RED |
| | | | | | --- |
| | | | | T11 | --- |
| | | | | T7 | --- |
| | | | 50:BLUE | T4 | --- |
| | | | | T11 | --- |
| | | | | T7 | --- |
| | | | 60:RED | --- | |
| | | | --- | | |
| | | | T6 | 30:BLUE | --- |
| | | | | 40:BLUE | --- |
| | | | | 50:RED | --- |
| | | | | --- | |
| | | | T10 | --- | |
| | | 40:BLUE | T3 | --- | |
| | | | T6 | --- | |
| | | | T10 | --- | |
| | | 50:BLUE | --- | | |
| | | 50:BLUE | --- | | |
| | | 70:RED | --- | | |
| | | --- | | | |
| | | T5 | --- | | |
| | | T0 | --- | | |
| | (FROM NORTH) | T2 | --- | | |
| | | T9 | --- | | |
| | | T0 | --- | | |
| | (FROM WEST) | --- | | | |
| | (FROM EAST) | --- | | | |
| T2 | | | | | |
| T3 | | | | | |
| --- | | | | | |

(a)

(b)

ON-BOARD VEHICLE NAVIGATION DEVICE AND PROGRAM

INCORPORATION BY REFERENCE

The disclosure of Japanese Patent Application No. 2008-230938 filed on Sep. 9, 2008, including the specification, drawings and abstract thereof, is incorporated herein by reference in its entirety.

BACKGROUND OF THE INVENTION

1. Field of the Invention

The present invention relates to on-board vehicle navigation devices and programs.

2. Description of the Related Art

Conventionally, various technologies are being proposed for systems that announce to a driver a lighting state relating to a traffic signal (hereinafter referred to as "signal") that a driving vehicle will pass through.

As an example, Japanese Patent Application; Publication No. JP-A-2008-033774 discloses a system that announces the lighting state (hereinafter referred to as "indication") of a signal that is located ahead of and closest to the vehicle, by performing communication between the on-board vehicle device and a center accumulating information relating to the indication of the signal at certain moment for a plurality of signals.

SUMMARY OF THE INVENTION

However, as the technology described in the above Japanese Patent Application, Publication No. JP-A-2008-033774, the conventionally-known technology that announces the indication of the signal is structured based on the assumption of determining the indication of the signal that the driving vehicle will firstly pass through. Here, there is a demand for a method of predicting the indication of not only the firstly-passing signal but also a certain signal among the signals that the vehicle will pass through next on a route to be traveled by the vehicle; however, a technology that realizes such method is still unknown.

In order to solve the problems described above, it is an object of the present invention to provide an on-board ("in-vehicle") navigation device that is capable of determining the indication of an arbitrary signal existing on a route that a host vehicle will travel next.

The on-board vehicle navigation device according to the present invention includes a current position information acquisition unit that acquires current position information relating to a current position of a host vehicle; a signal information acquisition unit that acquires signal position information relating to positions where signals are installed and signal indication information for determining indication of each signal; a target signal setting unit that sets a specific signal as a target signal based on the signal position information; a route search unit that searches for a route from the current position to the target signal based on the current position information and the signal position information; a signal indication determination unit that determines the indication of the target signal at the time of arrival of the vehicle at the target signal based on the route and the signal indication information; and an announcement unit that announces the indication of the target signal determined by the signal indication determination unit.

The present invention makes it possible to determine, not only the signal that the vehicle will firstly pass through, but also a certain signal among a plurality of signals that are ahead of the current position on the route to be traveled. At first, when arbitrarily selecting and setting a signal as the target signal, routes to the target signal are searched and one route is acquired. Then, when the host vehicle travels along the route from the current position to the target signal, the indication of the target signal at the time of arrival is determined based on the signal indication information acquired by the signal information acquisition unit. In this manner, according to the present invention, it is possible to determine and announce the indication of an arbitrarily selected target signal.

Further, in the present invention, the above signal indication information is exemplified by information that indicates a relationship between the indications of the signal and times. In a preferred embodiment, the signal indication determination unit calculates a travel time for the route based on the route and the signal position information and determines the indication of the target signal for the time of arrival of the vehicle at the target signal, based on the travel time of the route and the signal indication information. For example, in the case of utilizing, as the signal indication information, information that allows determination of the indication of each signal according to the time, if the determination is made based on the travel time of the route, it becomes possible to sequentially acquire a time of arrival of the vehicle at each signal and the indication of the signal at that time.

In another embodiment, the present invention utilizes, as the signal indication information, information that indicates a relationship between the indications of a plurality of signals. In this case, it is preferable that the signal indication determination unit identifies signals existing on the route and determines the indication upon arrival of the host vehicle at the target signal, based on the identified signals on the route and the signal indication information. Here, the relationship between the indications of a plurality of signals is a correlation of the signal indications seen between successive signals, such as when the vehicle passes a signal "T1" and heads for the next signal "T2" that is located at an adjacent signal intersection, the signal indication when the vehicle arrives at the next signal "T2" is likely to be an entry ("Go") signal. When using such information, it is not necessary to separately know the indication of each time for each signal. Therefore, if there are a plurality of signals on the route, it is possible to determine the indication of the target signal by referring to the correspondence relationship in a series of signal indications for such plurality of signals.

The above-mentioned relationship between the indications of a plurality of signals may be associated with a plurality of travel times. Then, it is preferable that the signal indication determination unit calculate a travel time for travel between signals lying next to each other, among the signals existing on the route, and determine the signal indication for when the vehicle will arrive at the target signal, based on the travel time for each travel segment between one signal and the next signal and the signal indication information. The relationship of the signal indications between signals associated with a plurality of travel times can be explained as follows. That is, for example, when the vehicle travels from the signal "T1" to the next signal "T2", if the travel time between the two signals is 30 seconds, the indication of the next signal "T2" becomes an entry ("Go") signal. If the travel time between the two signals is 70 seconds, the indication of the next signal "T2" becomes a stop signal. As seen in this example, the indication of each signal at the time of arrival can vary according to the travel time. If the signal indication information including such a correspondence relationship is referred according to the travel time for each travel segment between one signal and the next signal, the fact that the actual travel time varies due to traffic congestion and personal driving habits of each driver can be taken into consideration. This makes it possible to determine the indication of the target signal more accurately.

In addition, it is preferable that the indication of the target signal determined in foregoing manner be displayed on a map together with the route to the target signal and announced to a user by the announcement unit. If the target signal is a signal that is located a plurality of signals ahead of the current position, it is highly possible that there are intersections to be passed through on the way to the target signal; therefore, a plurality of possible routes are supposed. And, the travel time required to arrive at the target signal and the indication at the time of arrival obviously depend on the traveled route. Therefore, it is highly desirable to know the indication together with the route. Here, if both the route and the indication of the target signal are displayed on the map screen, the determination result and the route to the target signal are easy to see and allow a user to learn, in advance of the actual travel, the indication of the signal that is located a plurality of signals ahead. In addition, based on the determination result displayed together with the map screen in this manner, the user can easily know the travel time to a destination and determine an easy-to-travel route.

As mentioned above, a plurality of routes are supposed to exist between the current position and the target signal. Therefore, the route search unit may search for a plurality of routes from the current position to the target signal, the signal indication determination unit determines the signal indication at the time of arrival of the vehicle at the target signal for each of the plurality of routes, and the announcement unit displays one route from among the plurality of routes and the indication of the target signal corresponding to the one route on a map. With this configuration, the user can learn the indication of the target signal according to each one of the plurality of routes. In addition, the determination of the indication can be utilized, for example, by the user to select an appropriate route from among the plurality of routes in consideration of the indication of the signal.

The above is explained as embodied in a vehicle navigation device. However, it can be a computer-readable medium encoded with a program as indicated below.

That is, the program includes: a current position information acquisition step (subroutine) that acquires current position information relating to a current position of a vehicle; a signal information acquisition step that acquires signal position information relating to a position where a signal is installed and signal indication information for determining the indication of each signal; a target signal setting step that sets a specific signal as a target signal based on the signal position information; a route search step that searches for a route from the current position to the target signal based on the current position information and the signal position information; a signal indication determination step that determines the indication of the target signal for the arrival time of the vehicle at the target signal based on the route and the signal indication information; and an announcement step that announces the indication of the target signal that was determined in the signal indication determination step.

By executing such program, the same effects as described above for the on-board device can be accomplished.

BRIEF DESCRIPTION OF THE DRAWINGS

FIG. 7 is an explanation drawing that exemplifies a structure of system information of signals according to a second embodiment of the present invention.

FIG. 9 is an explanation drawing that exemplifies a structure of the system information of signals according to a third embodiment of the present invention.

DETAILED DESCRIPTION OF THE PREFERRED EMBODIMENT

Hereinafter, embodiments of the present invention will be described with reference to the drawings.

First Embodiment

Figure 1A:
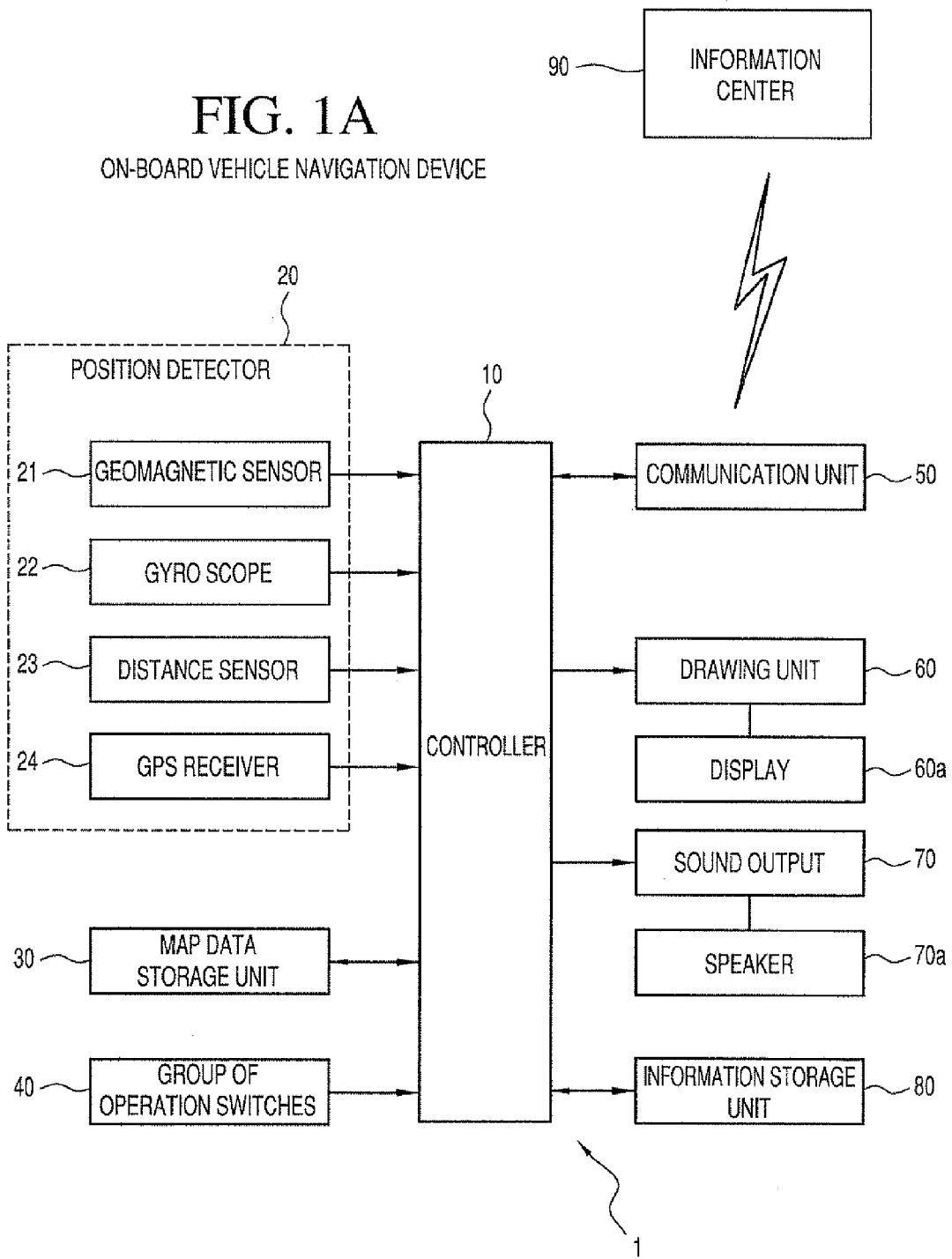
FIG. 1A is a block diagram showing a structure of an on-board vehicle navigation device according to a first embodiment of the present invention.
Figure 1B:
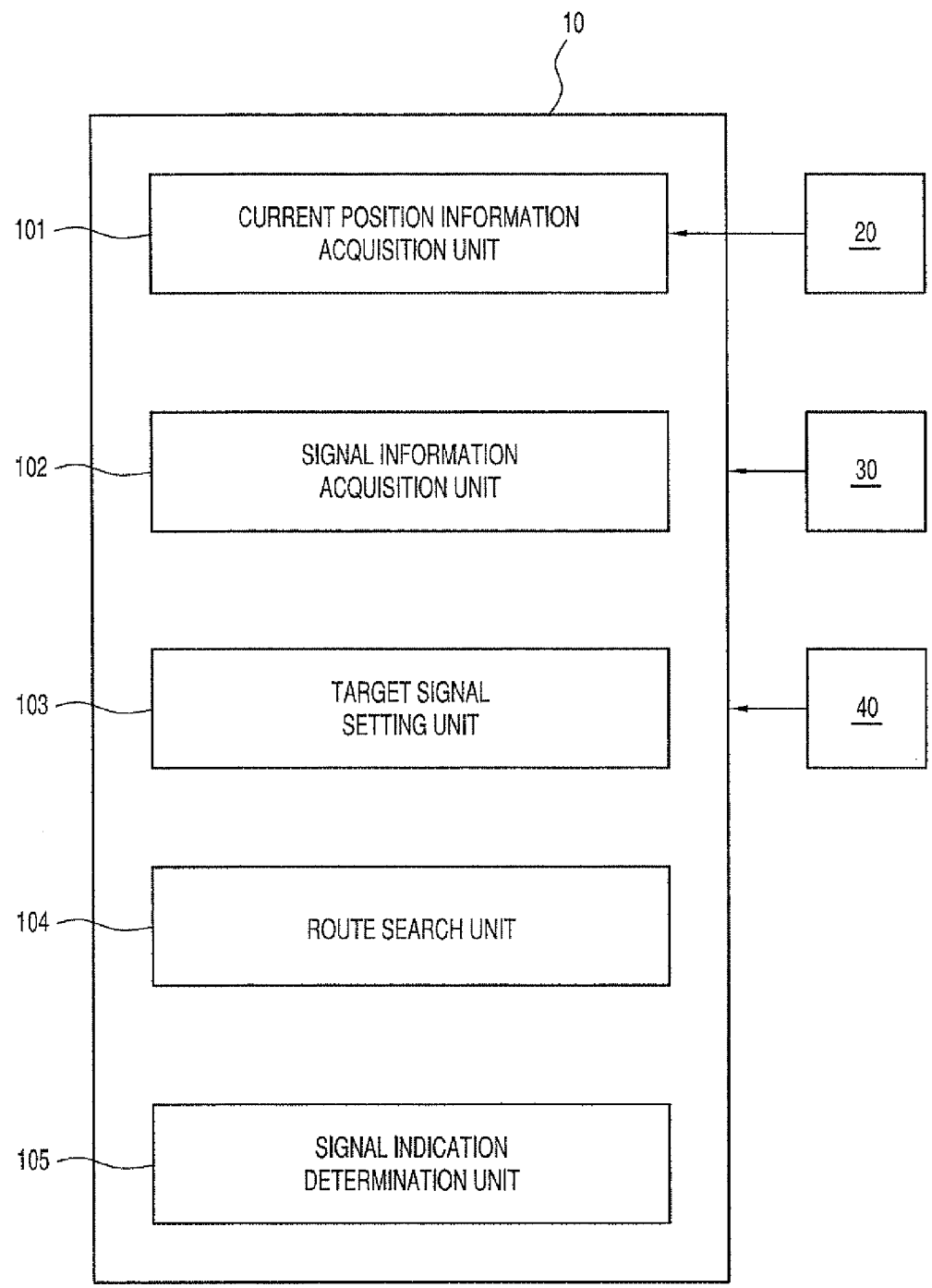
FIG. 1B is a block diagram showing the functional components of the controller 10 of FIG. 1A.

FIG. 1A is a block diagram showing an overall structure of an on-board vehicle navigation device 1 according to a first embodiment of the present invention. The on-board vehicle navigation device 1 includes a controller 10, a position detector 20, a map data storage unit 30, a group of operation switches 40, a communication unit 50, a drawing unit 60, a sound output unit 70, and an information storage unit 80. The controller 10 is arranged in the center and connected to the position detector 20, the map data storage unit 30, the group of operation switches 40, the communication unit 50, the drawing unit 60 ("announcement unit"), the sound output unit 70 (another "announcement unit"), and the information storage unit 80. In addition, the controller 10, which may be a conventional computer, includes a CPU, a ROM, a RAM, an I/O, and a bus line for connecting these members. Further, the drawing unit 60 is electrically connected to a display 60a. The sound output unit 70 is electrically connected to a speaker 70a. FIG. 1B illustrates the controller 10 programmed as described herein to operate as a current position information acquisition unit 101, a signal information acquisition unit 102, a target signal setting unit 103, a route search unit 104 and a signal indication determination unit 105.

The position detector 20 includes a geomagnetic sensor 21, a gyroscope 22, a distance sensor 23, a GPS (Global Positioning System) receiver 24 that detects a position of a vehicle based on electric waves from satellites, and the like, all of which are well-known units. These units 21 to 24 including sensors have different kinds of errors; therefore, they are used with mutual compliment. In addition, the position detector 20 may include only a part of the above-mentioned units although it depends on the accuracy. Additionally, a rotation sensor of a steering wheel, a wheel speed sensor for each wheel, or the like may be utilized.

The map data storage unit 30 stores so-called map matching data for improvement of a position detection accuracy and map data. The map data includes node data indicating a node and link data indicating a road as a link. The node data is associated with a node number, a coordinate, and link numbers of connecting links for each node. The link data is associated with a link number and a travel direction for each link. In the present embodiment, the map data storage part 30 is structured with a hard drive device (HDD). Although the HDD is utilized in the present invention, other media such as a DVD-ROM, a memory card, or the like can be utilized.

The group of operation switches 40, which includes a touch switch or a mechanical switch integrated with the display 60a, a remote control device, or the like, is used for various kinds of input.

The communication unit 50 receives information from an information center 90. In the present embodiment, the communication unit 50 and the information center 90 can bi-directionally communicate over telephone lines, and the on-board vehicle navigation device 1 acquires various kinds of information from the information center 90. In addition, information from the on-board vehicle navigation device 1 is accumulated as probe information in the information center 90. Further, traffic information from a VICS (a registered trademark: Vehicle Information and Communication System) center is accumulated in the information center 90.

The information storage unit 80 is a storage device, which is structured with, for example, the hard disk device as the map data storage unit 30. Obviously, the information storage unit 80 can be a device other than the hard drive device. The information storage unit 80 stores signal data indicating various kinds of information relating to the signal. In the present embodiment, the signal data includes a signal number that is capable of identifying a signal, signal position information relating to the position of the signal, and signal indication information used for determining the indication of each signal.

Here, the structure of the above signal data in the present embodiment is specifically explained. Hereinafter, it is assumed that the signal in the present embodiment represents, by a unit of an intersection where the signals are installed (hereinafter referred to as "signal intersection"), a group of a plurality of signals at the signal intersection. That is, the signal number is identification information for determining a signal intersection where each signal is installed.

In addition, in the signal data, the signal position in the map data for each signal, that is, the node number of the node representing the installed signal intersection, and the signal number are associated in advance, which makes it possible to determine each signal in the map data. In the present embodiment, the node number is included in the signal position information. Further, the signal data includes the signal indication information that is associated with each signal number and entry directions to the signal intersection corresponding to the each signal number. In the present embodiment, the entry directions, from which the vehicle enters each signal intersection, are determined from the link number of each link that is connected to the node corresponding to the signal intersection and the travel direction exemplified by "UP" and "DOWN". The signal indication information for each signal includes signal information for each direction that was determined by the link number and the travel direction of the link. Obviously, if "UP" and "DOWN" exist in different links, the entry direction can be determined only by the link number. In addition, since the signal number in the present embodiment is associated with the node number, it is possible to determine the signal by using the node number as the identification information instead of the signal number.

Figure 2:
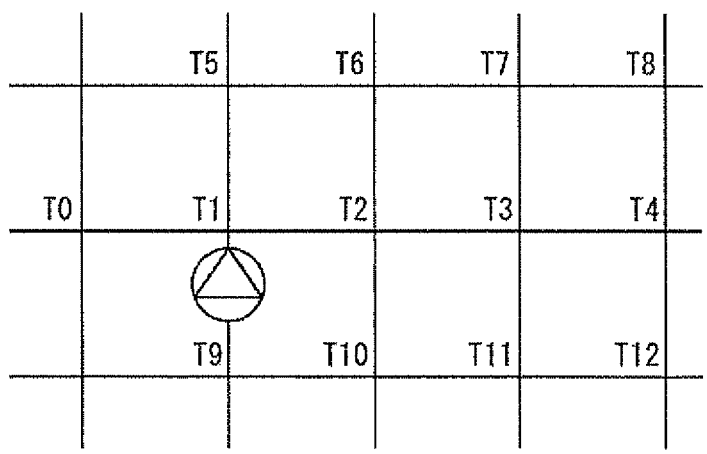
FIG. 2 is an explanation drawing that exemplifies map data used for signal indication information determination processing according to the first embodiment of the present invention.

The structure of the signal indication information of the first embodiment is explained in further detail with reference to FIG. 2. FIG. 2 is a drawing simplified for explaining the map data. At the signal intersections indicated by the nodes in the map data, the signals assigned with the signal numbers T0 to T12 are installed. In addition, the links extend from the respective signal intersections to north, south, east and west when assuming for the explanation that the upper side of FIG. 2 is the north. Hereinafter, for example, it is assumed that the link corresponding to the road extending from the signal T9 to the signal intersection with the signal T1 is "link entering the signal T1 from the south side". In the actual map data, the entry direction to the signal intersection can be determined by the link number of the link to be traveled prior to the entry to such signal intersection (for example, the link number of the link connected to the node corresponding to the signal intersection) and the travel direction of the link.

In the present embodiment, the signal indication information is information indicating the correspondence relationship between the indication of the signal and times, that is, information representing transition of the indication with respect to time for each signal. Here, for the indication of the signal, the explanation is made on the assumption that "blue" (which would be "green" in the USA) indicates an entry ("Go") signal, "red" indicates a stop signal, and "red" includes "yellow". For example, the signal indication information of the signal T1 is exemplified as follows: the indication of "7:00:00 to 7:02:00" is "blue" and the indication of "7:02:00 to 7:04:00" is "red" when the entry direction to the signal intersection with the signal T1 is "from south". According to this example, in addition, the indication of "7:00:00 to 7:02:30" is "red" and the indication of "7:02:30 to 7:04:00" is "blue" when the entry direction to the same signal T1 is "from west". In this manner, the signal indication information of each signal includes a plurality of time series data for each entry direction.

Next, indication information determination processing of the signal, which is executed in the on-board vehicle navigation device 1 including the above structure, is explained.

Figure 3:
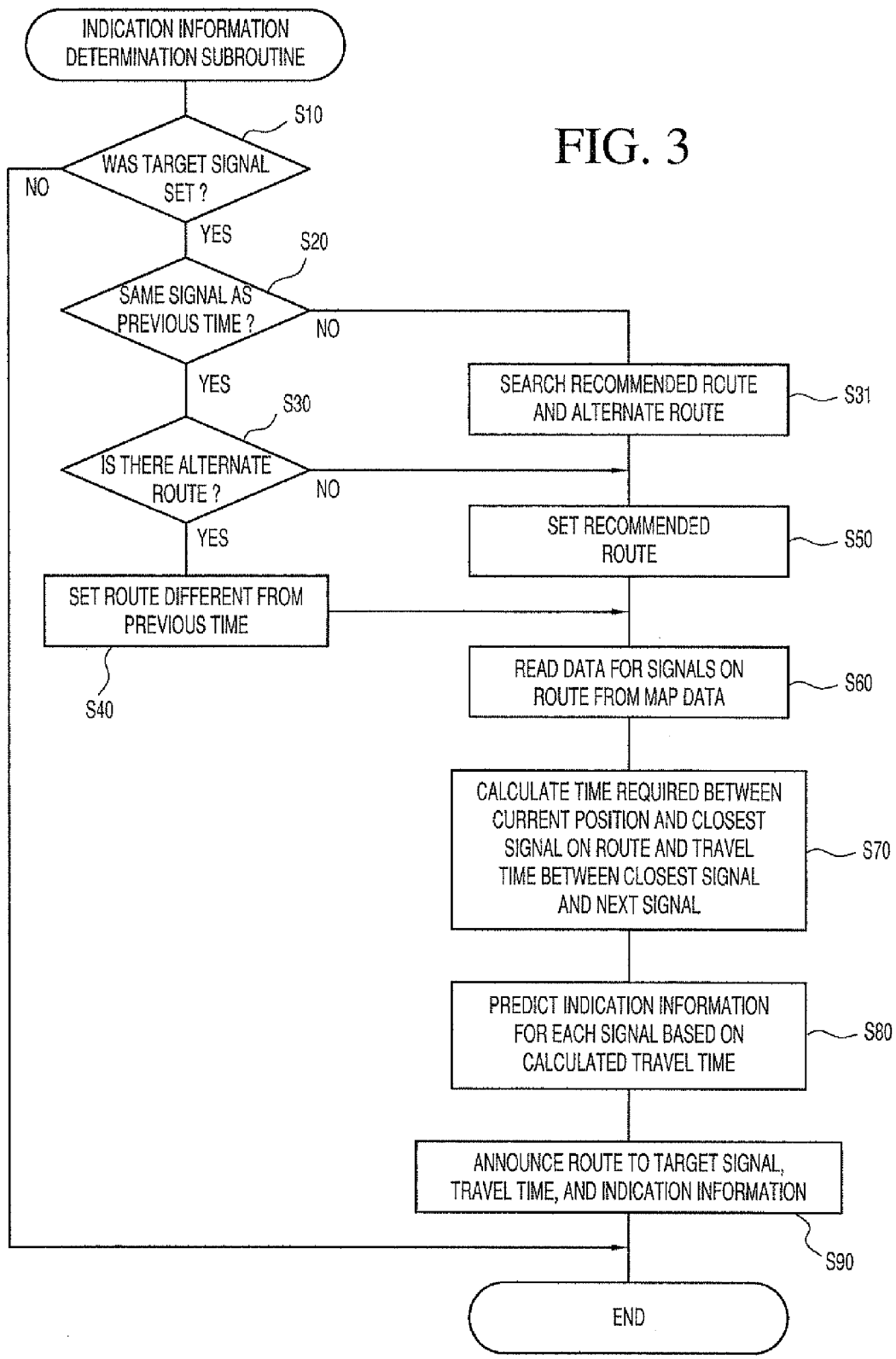
FIG. 3 is a flow chart showing the signal indication information determination processing according to the first embodiment of the present invention.

FIG. 3 is a flowchart showing the indication information determination processing executed in the on-board vehicle navigation device 1 in the first embodiment. This processing is repeatedly executed at intervals of a predetermined period of time in the on-board vehicle navigation device 1.

Figure 4:
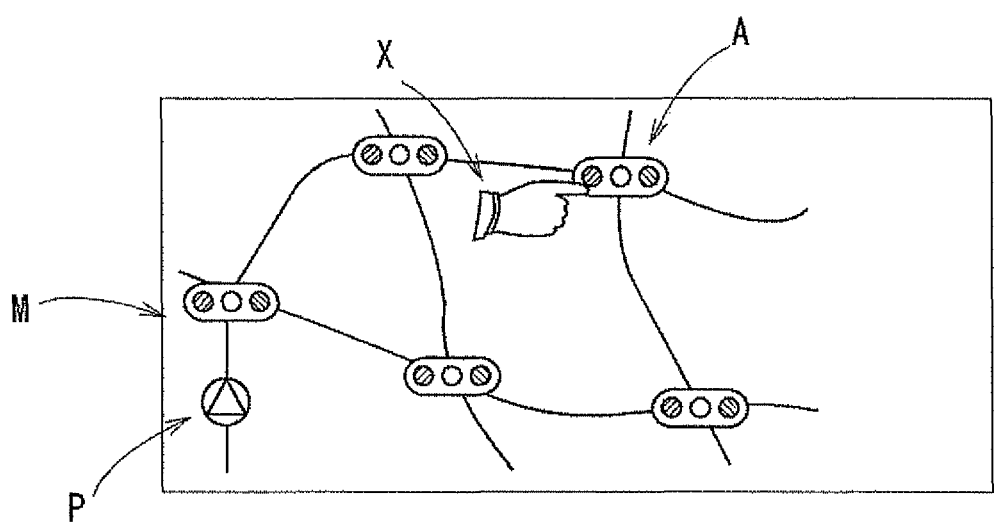
FIG. 4 is an explanation drawing showing a concrete example of setting a specific signal from a map display screen using the on-board vehicle navigation device according to the first embodiment of the present invention.

At the first step (hereinafter "step" is represented simply by a symbol "S") 10, it is determined whether or not the target signal has been set. Here, "setting the target signal" is executed, for example, through operation of selecting the target signal (the signal A shown by a pointer X in FIG. 4) with use of the group of operation switches 40 from the icons of the signal shown according to the positions, where the signals exist, such as the signal intersection and the like on a screen like the map display screen M in FIG. 4. In the present embodiment, it is exemplified that the node is determined by the position specified in the map and the signal corresponding to such node is set as the target signal. In this manner, if it is determined that the target signal has been set (S10: YES), the procedure proceeds to S20. On the other hand, if it is determined that the target signal has not been set (S10: NO), the indication information determination processing terminates without executing the subsequent processing.

At S20, it is determined whether or not the target signal set at S10 is the same signal as the previous time. This processing is to determine whether or not the indication information determination processing was performed repeatedly and the same signal has been set as the target signal consecutively. For example, if the signal T3 in FIG. 2 was set as the target signal, it is determined at S20 whether the determination was performed for the signal T3 also at the previous time. Here, if it is determined that the target signal is the same signal as the previous time (S20: YES), the procedure proceeds to S30. On the other hand, if it is determined that the target signal is not the same signal as the previous time, including a case in which the indication information determination processing was not immediately performed (S20: NO), the procedure proceeds to S31.

Figure 5:
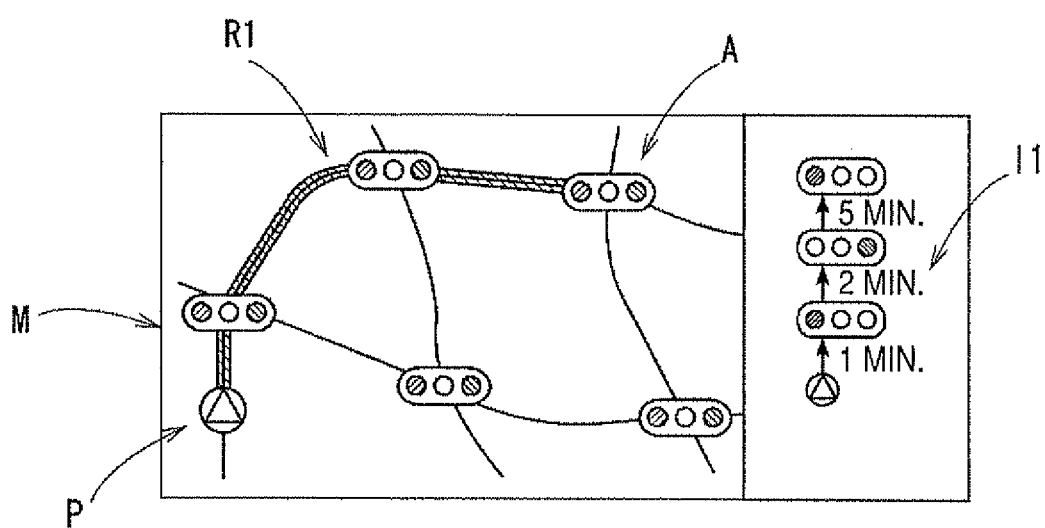
FIG. 5 is an explanation drawing that exemplifies a signal indication information display screen using the on-board vehicle navigation device according to the first embodiment of the present invention.
Figure 6:
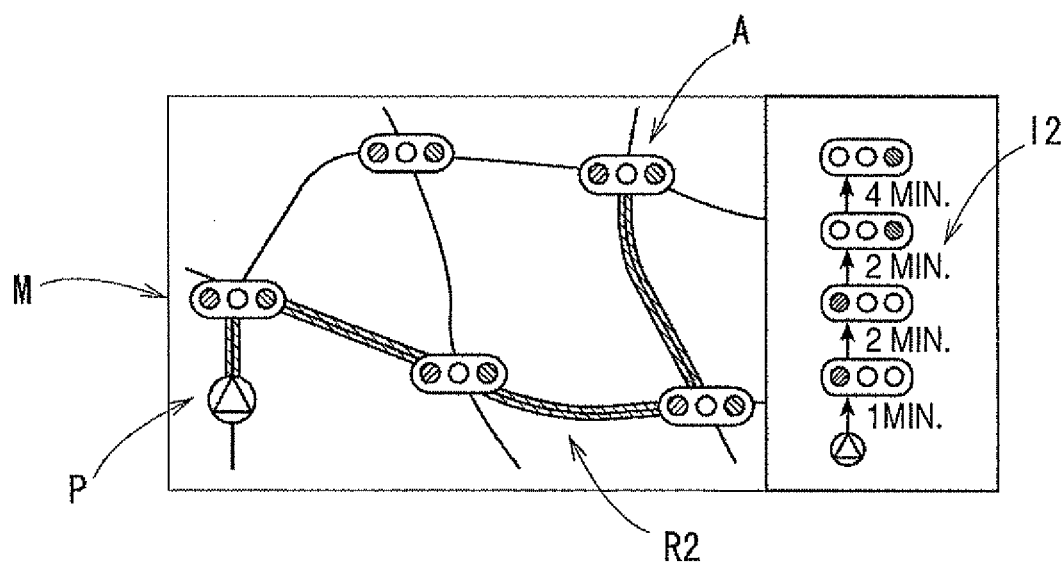
FIG. 6 is an explanation drawing that exemplifies a signal indication information display screen using the on-board vehicle navigation device according to the first embodiment of the present invention.

At S31 to which the procedure proceeds in a case where it is determined that the target signal is not the same signal as the previous time, a recommended route and an alternate route are searched. That is, 2 routes from the current position of the vehicle to the target signal are searched. The processing executed at S31 in the present embodiment is processing to detect the current position of a host vehicle, indicated as P in FIGS. 4, 5, 6, 10(*a*) and 10(*b*), and to search for routes to the set target signal based on the map data stored in the map data storage unit 30 and information indicating the current position of the vehicle that was detected by the position detector 20 such as coordinate information or the like. In addition, for example, the route that is determined as the most appropriate route by reflecting various kinds of conditions such as a travel distance of a road, congestion based on the traffic information received in the communication unit 50 from the information center 90, or the like, that is, the "recommended route" is selected as the route from the current position to the target signal. Further, the "alternate route" is set as the route that is determined as the secondly-appropriate route after the "recommended route". For example, after the "recommended route to the target signal A" indicated as R1 in FIG. 5 was searched by the processing at S31, the "alternate route" indicated as R2 in FIG. 6 is searched. After executing the processing at S31, the procedure proceeds to S50.

At S30, it is determined whether or not an alternate route has been searched at S31 in the previously-executed indication information determination processing. That is, it is determined whether or not a route other than the recommended route was searched at S31 in the previously-executed indication information determination processing. If it is determined that there is an alternate route here (S30: YES), the procedure proceeds to S40. On the other hand, if it is determined there is no alternate route (S30: NO), the procedure proceeds to S50.

At S50, the recommended route is set as the "route" that is used when determining the indication of the target signal at S60 and the subsequent steps. After executing the processing at S50, the procedure proceeds to S60.

In addition, at S40, a route different from the route set by the previously-executed indication information determination processing is set as the "route". Specifically, if the recommended route was set as the "route" in the previous indication information determination processing, the alternate route is set. If the alternate route was set as the "route" in the previous indication information determination processing, the recommended route is set. After executing the processing at S40, the procedure proceeds to S60.

At S60, the signals on the route are read from the map data. Specifically, it is exemplified that the signal numbers and the signal indication information of the respective signals corresponding to the respective nodes on the route in the map data stored in the map data storage part 30 are read from the information storage part 80. For example, when the current position of the host vehicle is in front of the signal T1 as indicated in FIG. 2, if the signal T3 is set as the target signal, the signal data of the signal T1, the signal T2, and the signal T3 as the signals on the route is extracted (retrieved) and read at the processing of S60.

Next, at S70, a time required for travel between the current position and the closest signal on the route and a time required between consecutive signals next to each other on the route are calculated. Next, at S80, the indication information of the respective signals is predicted from the calculated times required. The processing is specifically explained with reference to FIG. 2. When the current position of the host vehicle is a point between the signal T9 and the signal T1 and the host vehicle is entering T1 from south, if an arrival time is "7:03:00", it is known that the indication will be "red" and the host vehicle will stop there. Here, if the target signal is set to the signal T3, the time required, which is estimated as a travel time from the current position including a stop time at the signal T1, is calculated as follows: if the indication of the signal T1 becomes "blue" at "7:04:00" and the time required to travel to the signal T2 is 1 minute, the indication of the signal T2 at "7:05:00", which is 1 minute later, is "blue" and the time required to travel from the signal T2 to the signal T3 is 5 minutes. In this manner, the time required for arrival at the target signal T3 is considered to be calculated. Alternatively, the time required may be calculated from a general travel speed on the route and the travel distance between each point on the route. Or, it may be calculated in consideration of congestion information.

In the next step S90, the route to the target signal, the travel time required, and the indication information of the target signal are announced. According to this processing, specifically, as indicated in FIG. 5, the route R1 and the indication of the target signal are announced for the target signal A set in the map display screen M of FIG. 4. Further, the announcement (notification) is preferably through an indication information determination result display screen I1, including the indication of the respective signals to be passed on the route R1 and the travel times required between the respective signals, is displayed on the map display screen M. In addition, if the indication for a case where another route is traveled to the target signal A is subsequently determined, it is possible that, for example, the route R2 and the indication of the target signal are announced and an indication information determination result display screen I2 including the indication of the respective signals to be passed on the route R2 and the times required between the respective signals is displayed on the map display screen M, as indicated in FIG. 6. Or, it is also possible that the two determination result display screens of FIGS. 5 and 6 are displayed side by side such that a user can easily select one of the two routes R1 and R2. The announcement can be executed in any form, provided that different determination results for the indication given according to different routes are announced in an easy-to-understand manner. The indication information determination processing terminates when announcement processing at S90 has completed.

Next, effects accomplished by the on-board vehicle navigation device 1 of the present embodiment are explained.

In the present embodiment, at first, when selecting and setting an arbitrary signal as the target signal to make the arbitrary signal to be target for determination, routes to the target signal are searched and one route is acquired for the determination. According to the present embodiment, it is a feature that the signal possible to be set as a determination target for the indication is not limited to the signal at which the host vehicle will firstly arrive, but can be arbitrarily selected on the map display screen. Although a plural number of routes are predicted as routes from the current position to the target signal, one route is acquired for the set signal in the present embodiment. Then, assuming that the vehicle travels along the route, for the respective signals including the target signal on the route, the indication at arrival can be subsequently determined using the signal indication information. In this manner, according to the present embodiment, it becomes possible to subsequently acquire times of arrival of the vehicle at the respective signals and the indication of the signals at such times. Consequently, it becomes possible to properly determine the indication even when the target signal is a signal that is located a plurality of signals ahead of the current position.

When a route adapted to an actual drive is searched, the route supposed to be the most appropriate is adopted as the recommended route and is automatically drawn in consideration of the travel distance of the road, the congestion, and the like. Or, the results of route determination by execution of a plurality of the indication information determination steps may be shown as a plurality of routes. With these configurations, it is possible to announce the determination result information with candidate routes including a preferred route to the arrival at a signal and the indication of the signal at arrival; therefore, it becomes possible to provide information relating to the indication of the arbitrary signal as information useful for the user to select an easy-to-travel route.

Second Embodiment

The above first embodiment is an example in which the signal indication information in the signal data stored in the information storage unit 80 is configured as the "information that indicates the correspondence relationship between the indication of the signal and times". However, if the signal indication information is the "information that indicates the correspondence relationship in the indication of a plurality of signals", it is preferable to adopt a configuration exemplified below as a second embodiment.

Here, for the structure of the on-board vehicle navigation device 1 according to the second embodiment of the present invention and the indication information determination processing executed in the on-board vehicle navigation device 1 in the second embodiment, portions different from the first embodiment are explained. In the second embodiment, the signal indication information including "signal system information" exemplified in FIG. 7 is accumulated as the information that indicates the correspondence relationship between the indications of a plurality of signals in the signal data stored in the information storage part 80 of the on-board vehicle navigation device 1 indicated in FIG. 1.

The correspondence relationship in the indications of a plurality of signals, which is realized in the signal system information indicated in FIG. 7, can be specifically explained using the map data indicated in FIG. 2 as follows. That is, the signal system information is data having the correspondence relationship in the indications of a plurality of consecutive signals, such as, when the vehicle passes the signal T1 and travels for the next signal T2 located at the next signal intersection, the indication of the signal T2 of when the vehicle arrives at the next signal T2 is likely to be "blue".

The system information for signals indicated in FIG. 7 includes the indication that is predicted to be indicated when arriving at the next signal, for each "passed signal" which is an origin signal for determining the indication of the target signal. The indication is determined according to the direction from which the vehicle entered the signal intersection having the passed signal. As seen from FIG. 7, in the system information, if the indication of the next signal that is predicted to be indicated upon arrival is "blue", the indication of the subsequent signal predicted for arrival is also shown. In the system information, the signal of which the indication upon arrival is predicted "red" is set as an end point, and data indicating a series of the indications of the signals from the "passed signal" to such signal predicted "red" is included.

In addition, according to FIG. 7, the above-mentioned "the required travel time to the signal" is indicated with numbers in parentheses in the table on the second time scale in the present embodiment. In this manner, the system information for signals in the present embodiment may be data including information relating to the time required between signals. The travel time required between signals may be, for example, an average time required to travel a section from a stop line associated with a signal to a stop line associated with the next signal, which may be calculated using an average vehicle speed and the travel distance of such section. Or, the average travel time may be acquired from data, in which travel times of vehicles that traveled such section are accumulated as probe information, and used as the time required. In the present embodiment, although the information relating to the travel time required between signals itself does not need to be used for the determination of the indication, it is exemplified as one embodiment that such information is used for announcing the travel time required for the route, together with the indication of the signal, by the navigation device 1.

Here, as in the first embodiment, it is preferable to determine the entry direction to the signal intersection connected to each link based on the link number of the link to be passed prior to the entry to such signal intersection and the travel direction. However, in the explanation of FIG. 7, as a matter of convenience, it is assumed that the upper side of FIG. 2 is the north. When determining the entry direction to each signal intersection using links extending from each signal intersection to north, south, east and west, the entry direction is designated "from south", "from west", and the like. In addition, the "passed signal" in FIG. 7 refers to the signal defined as "lastly-passed signal among the signals that the host vehicle passed through before arriving at the current position". Consequently, in the signal system information in FIG. 7, for example, if entering the signal T1 in FIG. 2 from the signal T9 side, the entry direction to the signal T1 is "from south". Further, for example, if arriving at the signal T1 and heading for the signal T2, the signal T1 becomes the passed signal at the time when the current position of the host vehicle has moved into the section between the signal T1 and the signal T2.

In the present embodiment, using a case where the entry direction of the passed signal "signal Tn (n=1, 2, . . . )" is "from D (D=south, north, . . . )" as a reference, the signal system information is structured by arranging systematically the indications when arriving at the signals, which are candidates for the subsequently-passing signals, together with the signal intersections where the passed signals are installed and the entry directions to such signal intersections (for example, node numbers of nodes corresponding to the respective signal intersections, link numbers of links connected to such nodes, and travel directions of the links), in order of arrival, such as "second signal", "third signal".

For example, if the signal T3 is set as the target signal and the vehicle passed through the signal T1 as the passed signal from south, the indication when passing through the signal T2 and arriving at the target signal T3 is given from the system information of signals in FIG. 7, such as "T2" as "second signal" is "blue" and "T3" as "third signal" is "blue.

In addition, as indicated above, in the present embodiment, a case where the signal is "red" is set as the end point of data consecutive for the respective passed signals. Therefore, if there is a signal becoming "red" on the route to the target signal, the signal becoming "red" is set as the passed signal and data having such signal as a start point is referred to. For example, when the host vehicle is on the way to the signal T1 after passing through the signal intersection with the signal T2 from south, the signal system information can be referred to as follows. As an example, if setting the signal T5 as the target signal, a case "passed signal: T2, entry direction: from south" in FIG. 7 is referred to. Then, it is known that "T1" as "second signal" becomes "red". Here, the indication of "third signal" for a case where "second signal" is "red" is not shown; therefore, a case "passed signal: T1, entry direction: from east" is referred to. Then, the indication of "T5" as "second signal" can be determined (not shown in FIG. 7).

Next, the indication information determination subroutine executed by the on-board vehicle navigation device 1 according to the second embodiment, which is configured to use the above signal system information, is explained.

Figure 8:
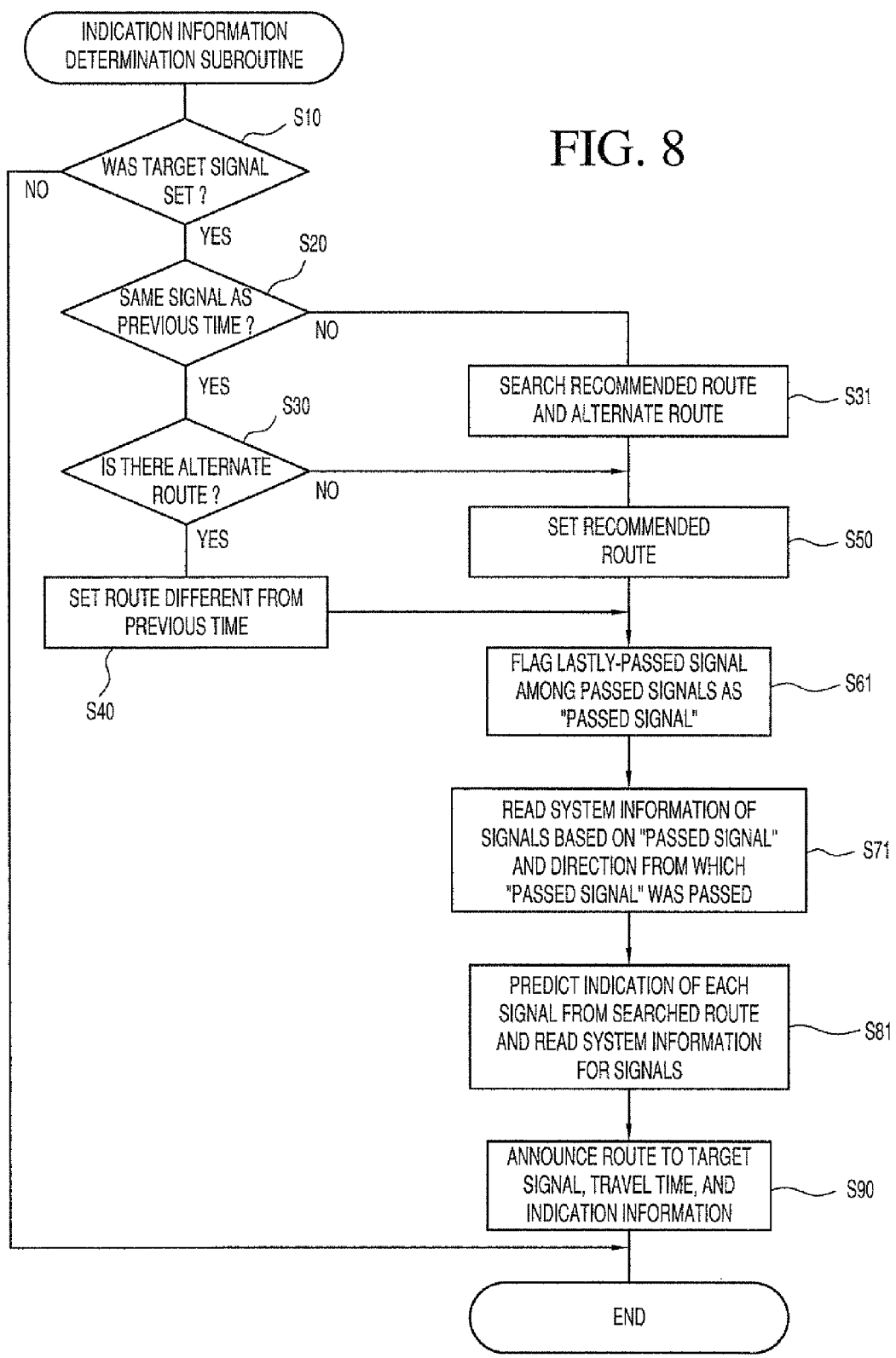
FIG. 8 is a flow chart showing the signal indication information determination processing according to the second embodiment of the present invention.
Figure 10:
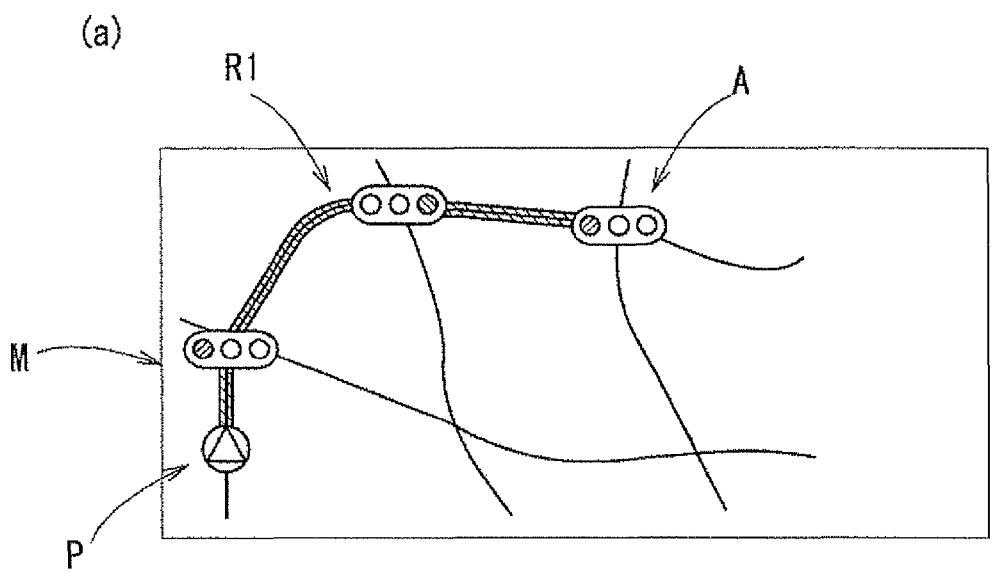
FIGS. 10A and 10B are explanation drawings showing alternative examples of the signal indication information display screen using the on-board vehicle navigation device according to other embodiments of the present invention.
Figure 10:
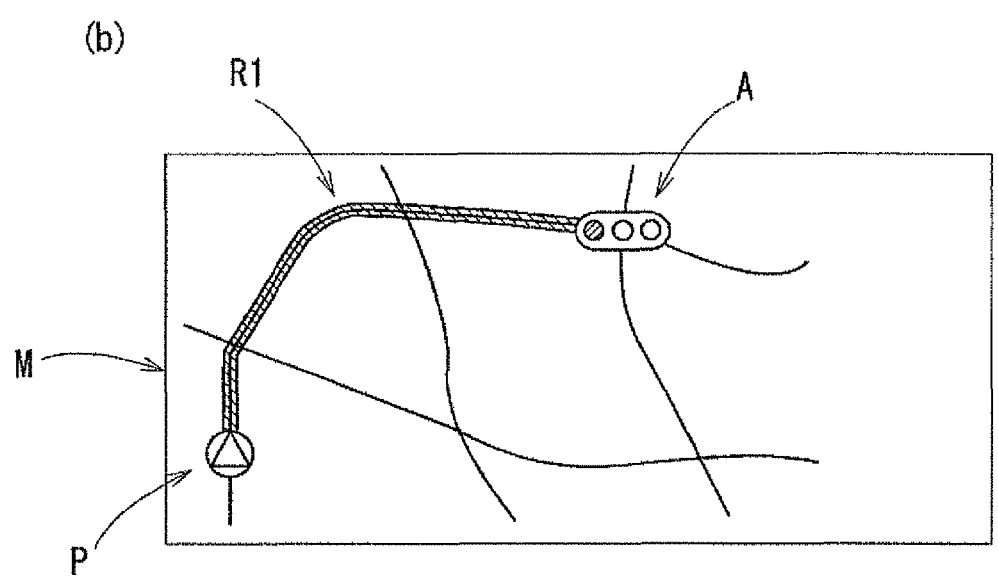

FIG. 8 is a flowchart showing the indication information determination subroutine executed by the on-board vehicle navigation device 1 in the second embodiment. The indication information determination subroutine in the present embodiment differs from the indication information determination subroutine in the first embodiment in that the processing of S61, S71, and S81 indicated in FIG. 8 is executed instead of S60, S70, and S80 indicated in FIG. 3. In addition, the on-board vehicle navigation device 1 according to the present embodiment is preferred for storing the signal, which the host vehicle lastly passed through, as the "passed signal" in the RAM. With this configuration, when executing the indication information determination subroutine for the signal, it becomes easy to extract the lastly-passed signal from the signals that the host vehicle passed through before the current position, and to read the signal system information. Hereinafter, the processing of S61, S71, and S81 is explained based on the assumption that the on-board vehicle navigation device 1 is so configured.

According to the present embodiment, after executing the processing of S40 or S50, the subroutine proceeds to S61. At S61, the lastly-passed signal is extracted as the "passed signal" from the signals passed before the current position. This can be executed by extracting the "passed signal" stored in the RAM when using the on-board vehicle navigation device 1 having the above-mentioned configuration.

Next, at S71, the signal system information is read based on the "passed signal" and the direction from which the "passed signal" was passed. In the subsequent S81, the indication information for the respective signals is predicted from the searched route and the read signal system information. With such processing, as explained above, the signal system information corresponding to the passed signal and the entry direction is read from the signal system information indicated in FIG. 7. Then, the indication information predicted for the respective signals along the searched route is extracted from the read signal system information, and the extracted indication information is used for determining the indication upon arrival at the target signal. Following this processing, the subroutine proceeds to S90 in the same way as in the first embodiment, and the route to the target signal, the travel time required, and the indication information of the target signal are announced. Then, the processing terminates.

In addition, at S90 in the present embodiment, the travel time required is calculated by a method different from the first embodiment. Specifically, information relating to the time required between the respective signals is read from the signal system information in FIG. 7; the time required between the respective signals is acquired for each travel segment between signals or the time required for the whole route is acquired by a method such as calculating the total of the times required; and the acquired required time is announced together with the route to the target signal and the indication of the target signal upon arrival.

Further, as indicated above, it is not necessary to use the time required for each travel segment between signals for determination of the signal indication in the second embodiment. Therefore, as an alternative, it is possible that the signal system information does not include such travel time required. In this case, the step of announcement processing by the on-board vehicle navigation device will include only the step of "announcing the route to the target signal and the indication of the target signal" instead of S90.

According to the above-mentioned second embodiment, even if the separate indication of each signal is unknown, it is possible to determine the indication of the target signal by deriving a correlation of the indication seen between the consecutive plurality of signals from a signal used as a reference indicated above as the "passed signal". Consequently, without requiring knowledge of the indication at each time for each signal, it becomes possible to determine the indication of the target signal based on the correspondence relationship in a series of indications for the signals on the route, which makes the determination of the indication of the target signal proceed smoothly. As a result, with the information including whether or not to stop at each of the signals before arriving at the target signal, the indication of an arbitrary target signal according to the route to be traveled to the target signal can be easily determined.

Third Embodiment

Regarding the "information that indicates correspondence relationship in the indication of a plurality of signals" as the above-mentioned signal indication information in the second embodiment, the correspondence relationship may be "correspondence relationship between the indications of signals associated with a plurality of travel times". In such case, as exemplified in FIG. 9, when the vehicle travels from the signal "T1" to the next signal "T2" immediately after the indication of the signal "T1" has changed to the entry signal, if the travel time between the two signals is 30 seconds, the indication of the next signal "T2" becomes the entry signal; but if the travel time between these signals is 70 seconds, the indication of the next signal "T2" becomes the stop signal. Thus, the signal system information preferably includes the correspondence relationship between signals such as the indications of each signal at arrival correlated with travel times.

Specifically, in the second embodiment explained in detail with FIG. 7, for example, "time required between signals" is included in the signal system information as reference data to be referred to for announcing the time required. In the third embodiment, as indicated in FIG. 9, the "time required between signals" is included in the signal system information as indicating, through estimation, "travel time when the vehicle travels between signals", which is a variable parameter for each travel segment between signals. That is, as can be seen from FIG. 2, FIG. 7, and FIG. 9, the third embodiment is different from the second in the following point. In the case of the second embodiment, if the vehicle passed through the signal T1 ("passed signal") from the south and arrived at T3 ("target signal"), the indication is derived from the signal system information in FIG. 7 as follows: the indication of "T2" as "second signal" is "blue" and the indication of "T3" as "third signal" is "blue". However, in actual travel, the travel time between consecutive signals may vary due to occurrence of congestion between the signal "T1" and the signal "T2" or the like. To this end, in the above example, if the vehicle passed through the signal T1 as the passed signal from south, it is determined from the signal system information in FIG. 9 that "T2" as the "second signal" becomes "blue" if the section "between the signals T1 and T2" is traveled in 30 seconds and "red" if the section "between the signals T1 and T2" is traveled in 70 seconds. Therefore, in the present embodiment, the result acquired by estimation of actual travel times between signals under certain conditions is used as the "time required" for the determination of the indication information.

In addition, in the indication information determination subroutine of the third embodiment, for example, after executing the subroutine up to S61 in FIG. 8 in the same way as in the second embodiment, the same processing as in S70 in FIG. 3 of the first embodiment is executed, then the processing of "reading the signal system information based on the "passed signal", the direction from which the passed signal was passed, and the time required that is acquired by estimating the travel time between signals next to each other on the route" is executed, instead of S71 in the second embodiment. After that, the same processing as in S81 and S90 in the second embodiment is executed. After the route to the target signal, the time required, and the indication information for the target signal at arrival are announced, the subroutine terminates.

In this manner, when the signal indication information including the correspondence relationship of a plurality of signals, which varies according to the time required based on the travel time estimated for each travel segment between consecutive signals, is referred to according to the travel time required for each segment between signals, the indication of the target signal can be determined in consideration of the fact that the actual travel time varies due to congestion of a road, the personal habits of each driver, and the like. As a result, it is possible to provide a navigation device that determines and announces the indication of an arbitrarily selected signal with high accuracy, by flexibly adapting to the actual travel.

Other Embodiments

The present invention is not limited to the above-mentioned embodiments. Accordingly, various alternatives may be possible without departing from the broad spirit and scope of the underlying principles.

For example, in the above-described embodiments, a plurality of signals are grouped by signal intersection and are represented by a signal number. However, as another embodiment, the signal data may have one signal associated with one signal number. In this case, for example, for one signal, the node number corresponding to the installed signal intersection and information that can determine the entry direction from which the vehicle enters the signal intersection for such one signal (for example, link numbers of links connected to the node corresponding to the signal intersection) are associated with the signal number. In this alternative, for example, the system information of signals indicated in FIG. 7 or the like is configured to include the signal number instead of the entry direction.

In addition, in the above-described respective embodiments, the user selects and sets the target signal. However, in the present invention, the target signal may be automatically set in the on-board vehicle navigation system, so that as the indications of a consecutive plurality of signals along a road are automatically announced, the indication is also announced for the signal located a predetermined number of signals ahead on the route in route guidance that is performed in the on-board vehicle navigation device, or the like. If the target signal is automatically set in the present invention, various configurations including announcing the indication of the signal at arrival can be applied.

Further, in the display screen of the signal indication information indicated in FIGS. 5 and 6, which is exemplified as a configuration of announcing the indication of the target signal in the above-described respective embodiments, the route and the indications of signals on the route at arrival may be announced with icons for the signals drawn on the map screen, without displaying the determination result display screen, as shown in FIGS. 10A and 10B. That is, according to the examples in FIGS. 10A and 10B, the icon of the target signal (A in FIG. 10A) itself indicates the signal indication upon arrival. In addition, with the target signal set, it is also possible not to display on the map screen the icons of the signals other than the icons corresponding to the signals on the route, as shown in FIG. 10A. Further, it is also possible to announce the indication only with the icon for the target signal as shown in FIG. 10B. In this manner, the display of the map screen does not become complicated, and the user can recognize the indication of the target signal at a glance.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

I claim:
1. An on-board vehicle navigation device comprising:
a current position information acquisition unit that acquires current position information relating to a current position of a host vehicle;
a signal information acquisition unit that acquires signal position information relating to positions where plural signals are respectively installed and signal indication information, including a relationship between indications of a signal and time, for determining indication of each signal, each signal changing indications in a timed sequence;
a target signal setting unit that sets a specific signal as a target signal based on the signal position information;
a route search unit that searches to determine a plurality of routes from the current position to the set target signal based on the current position information and the signal position information;
signal indication determination unit that calculates a required travel time for each of the determined plurality of routes and that determines the indication of the target signal at arrival times the vehicle would arrive at the target signal by travel of each of the determined plurality of routes, based on the calculated required travel time for each route of the plurality of routes and the signal indication information; and an announcement unit that notifies a driver of the host vehicle of the indication of the target signal determined by the signal indication determination unit for each of the plurality of routes, the indications of the target signal and arrival times at the target signal differing among the plurality of routes; and wherein the announcement unit displays one route from among the plurality of routes as a candidate route with the determined indication of the target signal at the arrival time for travel of the one route on a map display showing each of a plurality of routes.

2. The on-board vehicle navigation device according to claim 1, wherein the signal indication information is information that indicates a relationship between the indications of a plurality of signals, and the signal indication determination means identifies signals existing on each route of the plurality of routes, based on the route and the position information and determines the indication of the target signal for when the vehicle will arrive at the target signal, based on the signals existing on each route and the signal indication information.

3. The on-board vehicle navigation device according to claim 2, wherein the relationship is associated with a plurality of travel times, and the signal indication determination unit calculates a travel time for each distance between signals identified as existing on each route, and determines the indication of the target signal of when the vehicle arrives at the target signal based on the travel time for each distance between the adjacent signals and the signal indication information.

4. The on-board vehicle navigation device according to claim 1, wherein the signal indications include indications for stop and go.

5. The on-board vehicle navigation device according to claim 1, wherein the announcement unit further displays a second route from the among the plurality of routes from the current position to the set target signal with the indication of the target signal at the arrival time at the target signal for the host vehicle traveling the second route.

6. A non-transitory computer-readable medium encoded with a program comprising:
   a current position information acquisition step that acquires current position information relating to a current position of a host vehicle;
   a signal information acquisition step that acquires signal position information relating to installation positions of plural signals and signal indication information, including a relationship between the indications of the signal and times, for determining indication of each signal, each signal changing indications in a timed sequence;
   a target signal setting step that sets a specific signal as a target signal based on the signal position information;
   a route search step that searches to determine a plurality of routes from the current position to the target signal based on the current position information and the signal position information;
   a signal indication determination step that calculates a required travel time for each of the determined plurality of routes and that determines the indication of the target signal at an arrival time of arrival of the vehicle would arrive at the target signal by travel of each of the determined plurality of routes, based on the calculated required travel time for each of the plurality of routes route and the signal indication information; and an announcement step that notifies a driver of the host vehicle of the indication of the target signal that was determined by the signal indication determination step for each route of the determined plurality of routes; and wherein:

the signal indication determination unit determines the indication of the target signal at the time the vehicle will arrive at the target signal for each of the plurality of routes, and the announcement step displays one route from among the plurality of routes as a candidate route with the determined indication of the target signal at the time of arrival for travel of corresponding to the one route on a map for each of a plurality of routes.

7. A non-transitory computer-readable medium encoded with a program according to claim 6, wherein the target signal setting step includes displaying a map showing a plurality of signals and selecting a target signal from among the displayed plurality of signals by use of an operation switch.

8. The on-board vehicle navigation device according to claim 1, wherein the target signal setting unit includes a display of the acquired positions where signals are installed and an operation switch for selection of, as the target signal, one of signals.

9. The non-transitory computer-readable medium encoded with a program according to claim 6, wherein the signal indications include indications for stop and go.

10. The non-transitory computer-readable medium encoded with a program according to claim 6, wherein the announcement step further displays a second route from the among the plurality of routes from the current position to the set target signal with the indication of the target signal at the arrival time at the target signal for the host vehicle traveling the second route.

* * * * *